United States Patent [19]
Hermes

[11] 3,714,214
[45] Jan. 30, 1973

[54] ALKOXY SILYL ALKYL COMPOUNDS

[75] Inventor: Matthew Edward Hermes, Wilmington, Del.

[73] Assignee: E. I. du Pont de Nemours and Company, Wilmington, Del.

[22] Filed: April 28, 1970

[21] Appl. No.: 32,739

[52] U.S. Cl.................260/448.8 R, 260/448.2 Q, 260/448.2 B
[51] Int. Cl........................C07d 103/04, C07f 7/02
[58] Field of Search...260/448.2 B, 448.8 R, 448.2 Q

[56] References Cited

UNITED STATES PATENTS

| | | | |
|---|---|---|---|
| 3,227,675 | 1/1966 | Papalos | 260/448.2 Q |
| 2,865,899 | 12/1958 | Hurwitz et al. | 260/448.2 B |
| 3,377,371 | 4/1968 | Quaal | 260/448.2 B |

*Primary Examiner*—James E. Poer
*Assistant Examiner*—Werten F. W. Bellamy
*Attorney*—Earl L. Handley

[57] ABSTRACT

A silyl vinyl ether having the formula

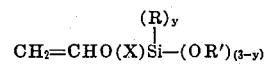

wherein X is an alkylene group of two to 10 carbon atoms, or an alkyleneoxyalkylene group of four to 16 carbon atoms, R is an alkyl group of one to six carbon atoms, y is 0, 1, or 2, and R' is an alkyl group of one to six carbon atoms; silyl fluoroolefin polymers made by polymerizing the silyl vinyl ether with fluoroolefins, and, optionally, with other vinyl ethers and/or ethylene and/or propylene and/or fluorine-substituted vinyl ether; compositions containing polysilicic acid and silyl fluoroolefin polymer made by polymerizing the silyl vinyl ether with fluoroolefin, and, optionally, with other vinyl ethers; coating compositions containing a compatible solvent and the polysilicic acid/silyl fluoroolefin polymer composition; articles coated with the silyl-fluoroolefin polymer/polysilicic acid composition and a process for coating them; and polymers made by polymerizing the silyl vinyl ether with formaldehyde or trioxane and, optionally, with alkylene oxides and/or dioxolane and/or alkyl vinyl ethers.

2 Claims, No Drawings

ALKOXY SILYL ALKYL COMPOUNDS

BACKGROUND OF THE INVENTION

This invention relates to alkoxy silyl alkyl compounds and more particularly to polymers made by polymerizing silyl vinyl ethers with fluoroolefins or formaldehyde or trioxane and, optionally, with a third monomer.

It is known that coatings for poly(methyl methacrylate) and other materials which have good initial hardness, ultraviolet resistance and abrasion resistance can be produced from polysilicic acid and copolymers of fluoroolefin and hydroxyalkyl vinyl ether (U.S. Pat. No. 3,429,845). However coatings tend to soften on exposure to atmospheric conditions due to their lack of long term moisture resistance. A composition of this type having moisture resistance as well as the ultraviolet resistance, abrasion resistance and initial hardness of the polysilicic acid/fluoroolefin-vinyl ether copolymer composition would fill a definite need.

Also sought has been a composition which could act as a crosslinking site in elastomeric type polymers such as those described in U.S. Pat. No. 3,051,677, but which is thermally stable and allows the elastomer to be cured with the use of moisture as opposed to the previously used complex cure systems. Another sought-after composition was one which could be polymerized with formaldehyde to form a compound which could be used to coat glass roving to render it easier to handle in manufacturing processes, i.e., render it more conducive to chopping at high speeds and which would not degrade polyoxymethylene when the coated chopped roving was incorporated into it.

SUMMARY OF THE INVENTION

Now according to the present invention a monomer has now been found which fulfills the above requirements. It is a silyl vinyl ether having the formula:

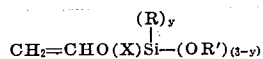

$$CH_2=CHO(X)\overset{(R)_y}{\underset{|}{Si}}-(OR')_{(3-y)}$$

wherein X is selected from the group consisting of an alkylene group containing two to 10 carbon atoms, and an alkyleneoxy-alkylene group containing four to 16 carbon atoms; R is an alkyl group containing one to six carbon atoms; y is 0, 1, or 2; and R' is an alkyl group containing one to six carbon atoms.

DESCRIPTION OF THE PREFERRED EMBODIMENTS

The silyl vinyl ether can be polymerized with fluoroolefins, and optionally with fluoroolefins and other vinyl ethers, to produce polymers which, when mixed with polysilicic acid, give a coating with the sought-after moisture resistance, ultraviolet resistance, initial hardness and abrasion resistance. The monomer is useful as the crosslinking site in the elastomeric polymers and can be polymerized with formaldehyde-containing monomers to form a coating compound for glass roving.

Alkyl and alkylene as used throughout includes straight, cyclic and branched alkyl or alkylene groups. Throughout the specification and claims W is not the chemical symbol for tungsten but rather, is as defined, mole percent refers to the mole percent of monomeric units, and "consisting essentially of" is meant as not excluding unspecified conditions or materials which do not prevent the advantages of this invention from being realized; in particular it is not meant to exclude the additives listed hereafter in the specification, in the stated proportions.

The silyl vinyl ether polymerizes with fluoroolefins monomers both singly and in combination with other vinyl ethers to form a polymer which produces moisture-resistant, ultraviolet-resistant, initially hard, and abrasion-resistant coating compositions when mixed with polysilicic acid, applied as a coating to a substrate, and cured. The silyl vinyl ether acts as a crosslinking site when polymerized in small amounts with elastomeric monomers, i.e., fluoroolefin singly or in combination with other vinyl ethers, ethylene, propylene and/or fluorine-substituted vinyl ether.

A silyl-fluoroolefin polymer, which utilizes the silyl vinyl ether as a crosslinking site for elastomeric polymers and which is an intermediate for producing hard coatings when mixed with polysilicic acid, is made by polymerizing 0.2 to 60 mole percent of the silyl vinyl ether with 40 to 99.8 mole percent of a substance consisting essentially of 100 to 40 mole percent of at least one polymerizable fluoroolefin of the formula $CZ_2 = CZ'Z''$ wherein Z is F, H or Cl, Z' is H, F, or Cl and Z'' is H, F, Cl, W, or OW, W being lower alkyl or perfluoroalkyl groups, preferably of one to four carbon atoms, and 0 to 60 mole percent of a monomer selected from the class consisting of omega-hydroxy alkyl vinyl ethers of three to 13 carbon atoms, alkyl vinyl ethers where the alkyl portion contains one to 20 carbon atoms, aryl vinyl ethers where the aryl portion contains six to 20 carbon atoms, aralkyl vinyl ethers where the aralkyl portion contains seven to 20 carbon atoms, monoalkyl, monovinyl ethers of monoalkylene glycols, monoalkyl, monovinyl ethers of polyalkylene glycols, ethylene, propylene, and mixtures thereof.

When the silyl-fluoroolefin polymer is to be mixed with polysilicic acid and used as an abrasion resistant coating, the silyl-fluoroolefin polymer will normally be made by polymerizing 1 to 60 mole percent (preferably 8 to 60 mole percent) of the silyl vinyl ether with 40 to 99 mole percent (preferably 40 to 92 mole percent) of a substance consisting essentially of 100 to 40 mole percent of at least one polymerizable fluoroolefin of the formula $CZ_2 = CZ'Z''$ wherein Z is F, Z' is F or Cl and Z'' is H, F, Cl, W, or OW, W being a lower perfluoroalkyl group preferably of one to four carbon atoms and 0 to 60 mole percent of a polymerizable vinyl ether selected from the class consisting of omega-hydroxy alkyl vinyl ethers of three to 13 carbon atoms, alkyl vinyl ethers where the alkyl portion contains one to 20 carbon atoms, aryl vinyl ethers where the aryl portion contains six to 20 carbon atoms, aralkyl vinyl ethers where the aralkyl portion contains seven to 20 carbon atoms, monoalkyl, mono-vinyl ethers of monoalkylene glycol, monoalkyl, monovinyl ethers of polyalkylene glycols and mixtures thereof. The above composition will hereinafter be referred to as the silyl-fluoroolefin coating composition.

When the silyl-fluoroolefin polymer is to function as an elastomeric type material, i.e., the silyl vinyl ether component acts as a crosslinking site, the silylfluoroolefin polymer will normally be made by polymerizing 0.2 to 10 mole percent, preferably 0.5 to 5 mole percent, of the silyl vinyl ether with 99.8 to 90.0 mole percent, preferably 95 to 99.5 mole percent, of a substance consisting essentially of 100 to 40 mole percent of at least one polymerizable fluoroolefin of the formula $CZ_2 = CZ'Z''$, wherein there is at least one F, and wherein Z and Z' are F, H or Cl and Z'' is H, F, Cl, W, or OW, W being lower alkyl or perfluoroalkyl group, preferably of one to four carbon atoms, and 0 to 60 mole percent of a member selected from the class consisting of alkyl vinyl ethers where the alkyl portion contains one to 20 carbon atoms, ethylene, propylene, and mixtures thereof. This composition is referred to hereinafter as the silyl-fluoroolefin elastomeric composition.

The silyl vinyl ether also forms a compound when it is polymerized with formaldehyde-type monomers which is a coating for glass roving and which doesn't degrade polyoxymethylene when the coated chopped roving is incorporated into the polyoxymethylene. Such a composition is a silyl polymer made by polymerizing 0.1 to 25 mole percent (preferred 0.5 to 5 mole percent) of the silyl vinyl ether presented above with 99.9 to 75 mole percent (preferred 99.5 to 95 mole percent) of a substance consisting essentially of 100 to 85 mole percent (preferred 100–93 mole percent) of a member selected from the class consisting of formaldehyde and trioxane and 0 to 15 mole percent (preferred 0 to 7 mole percent) of a member selected from the class consisting of alkylene oxide, dioxolane, alkyl vinyl ether where the alkyl portion contains one to 20 carbon atoms and mixtures thereof. This composition is referred to hereinafter as the silyl polymer.

The silyl-fluoroolefin coating composition usually from 90 to 10 percent by weight of a composition formed by mixing the coating composition with 10 to 90 percent by weight polysilicic acid (measured as $SiO_2$). This silyl-fluoroolefin coating/polysilicic acid composition is adapted for use as a coating composition by mixing it with a compatible solvent. The resulting mixture is up to 40 percent by weight of the silyl-fluoroolefin coating/polysilicic acid composition and the remainder is the compatible solvent. The preferred amount of silyl-fluoroolefin coating/polysilicic acid composition in the mixture containing the solvent is 5 to 15 percent by weight. Compatible solvent is meant to include those solvents or solvent systems in which the silylfluoroolefin coating/polysilicic acid composition is soluble, i.e., forms a homogeneous solution at room temperature, i.e., around 20°C. When the amount of polysilicic acid is described as being measured as $SiO_2$, this is meant to refer only to the $SiO_2$ in the composition from the polysilicic acid and not that from the silyl vinyl ether.

The silyl vinyl ether composition as recited above may have varying compositions. The preferred compositions, however, are those in which:

X is $-CH_2CH_2-$, $-(CH_2)_4OCH_2CH_2-$, $-(CH_2CH_2)_2CH_2CH_2-$, or $-CH_2CH_2OCH_2CH_2-$;
R is $-CH_3$;
Y is 1; and
R' is $-C_2H_5$.

The preferred polymerizable fluoroolefins which are polymerized with the vinyl ethers to make the silyl-fluoro-olefin polymer are tetrafluoroethylene, vinylidene-fluoride, trifluoromethyl vinyl ether, methyl trifluorovinylether, chlorotrifluoroethylene, hexafluoropropylene, perfluoromethyl vinyl ether, and perfluoropropyl vinyl ether. The W of the substituent group of the polymerizable fluoroolefin can include perfluoroalkyl groups or alkyl groups containing one to four carbon atoms; in particular, trifluoromethyl, pentafluoroethyl, heptafluoropropyl, methyl and ethyl. More than one fluoroolefin may be used in the silyl-floroolefin polymer. For the silyl-fluorolefin coating composition the preferred fluoroolefins are tetrafluoroethylene, chlorotinfluoroethylene, hexafluoropropylene, perfluoromethyl vinyl ether, and perfluoropropyl vinyl ether or mixtures thereof with tetrafluoroethylene being the most preferred. For the silyl-fluoroolefin elastomeric composition the preferred fluoroolefins are tetrafluoroethylene, vinylidene fluoride, trifluoromethyl vinyl ether, methyl trifluoro vinyl ether, hexafluoropropylene, perfluoromethyl vinyl ether and combinations thereof with a combination of vinylidene fluoride, and hexafluoropropylene being the most preferred.

The vinyl ethers usable in the silyl-fluoroolefin polymer include omega-hydroxy alkyl vinyl ethers of three to 13 chain atoms, particularly the aliphatics, especially those with the formula $CH_2 = CHO(CH_2)_n OH$, where $n$ is 2 to 8. Particularly useful vinyl ethers are 2-hydroxyethyl vinyl ether, 4-hydroxybutyl vinyl ether, 3-hydroxypropyl vinyl ether, 5-hydroxypentyl vinyl ether, and 6-hydroxyhexyl vinyl ether. Other useful vinyl ethers include:

2,3-dihydroxypropyl vinyl ether;
3-hydroxy-2,2-dimethylpropyl vinyl ether;
2-methyl-2hydroxymethyl-3-hydroxypropyl vinyl ether;
2-ethyl-2-hydroxymethyl-3-hydroxypropyl vinyl ether;
3-(hydroxymethyl)-5-hydroxypentyl vinyl ether;
2,2-bis(hydroxymethyl)-3-hydroxypropyl vinyl ether;
1-hydroxymethyl-4-vinyloxymethylcyclohexane; and
2-[2-hydroxyethoxy] ethyl vinyl ether.

The above vinyl ethers may be used alone in combination with the above vinyl ethers and the following vinyl ethers, which can also be used alone or in combination:

methyl vinyl ether;
isobutyl vinyl ether;
octadecylvinyl ether;
2-methoxyethyl vinyl ether;
2-[2-methoxyethoxy] ethyl vinyl ether; and
2-[methoxymethoxy] ethyl vinyl ether.

A particularly useful alkyl vinyl ether in the silyl polymer and silyl-fluoroolefin elastomeric composition is methyl vinyl ether while particularly useful vinyl ethers in the silyl-fluoroolefin coating composition are 4-hydroxy-butyl vinyl ether and methoxy ethyl vinyl ether.

The preferred alkylene oxides in the silyl polymer are ethylene and propylene oxide while formaldehyde is preferred over trioxane.

The proportion of components which are polymerized in making the silyl-fluoroolefin coating composition normally is about 50 mole percent of the polymerizable fluoroolefin and about 50 mole percent of the silyl vinyl ether and any other vinyl ether present, because the fluoroolefin and vinyl ether normally polymerize in a 1:1 ratio. There does not have to be any vinyl ether present other than the silyl vinyl ether or there can be as little as 1 mole percent (relative to the total moles of all components) of the silyl vinyl ether, the balance of the vinyl ether portion of the silyl-fluoroolefin coating composition being other vinyl ether. Preferably, however, there is at least 8 mole percent of the silyl vinyl ether relative to the total moles of all components. Examples of preferred silyl-fluoroolefin coating compositions are a polymer made by polymerizing a substance of about 50 mole percent tetrafluoroethylene, about 42 mole percent 4-hydroxybutyl vinyl ether, and about 8 mole percent methyldiethoxy-silylethyl vinyl ether, and a polymer made by polymerizing a substance of about 50 mole percent tetrafluoroethylene, about 33 mole percent methoxyethyl vinyl ether and about 17 mold percent 2(methyldiethoxysilyl) ethyl vinyl ether.

Examples of preferred silyl-fluoroolefin elastomeric compositions are those made by polymerizing a substance of about 0.8 mole percent 2(methyldiethoxysilyl) ethyl vinyl ether or 4(2-diethoxymethylsilylethoxy) butyl vinyl ether, about 49.2 mole percent methyl vinyl ether, and about 50 mole percent tetrafluoroethylene. Examples of preferred silyl polymers are those made by polymerizing a substance of 0.1 to to 5 mole percent propylene or ethylene oxide, 0.5 to 5 mole percent of the silyl vinyl ether (preferably 2(methyldiethoxysilyl) ethyl vinyl ether) and 90 to 99.4 mole percent of formaldehyde and those made by polymerizing a substance 95 to 99.5 mole percent formaldehyde and 0.5 to 5 mole percent of the silyl vinyl ether.

The composition formed when the silyl-fluoroolefin coating composition is mixed with polysilicic acid is preferably 60 to 75 weight percent silyl-fluoroolefin coating composition and 25 to 40 (measured as $SiO_2$) weight percent polysilicic acid. The silyl-fluoroolefin component (referred to in the claims as the silyl containing composition) may be mixtures of the various silyl-fluoroolefin coating compositions described above. It can also be a mixture of one of the silyl-fluoroolefin coating compositions described above and a polymer which is a copolymer of one or a mixture of fluoroolefins and one or a mixture of the various other vinyl ethers enumerated above for the silyl-fluoroolefin coating composition. The non-silyl copolymer can be as much as about 80 mole percent of silyl-fluoroolefin component, but preferably is less than 50 mole percent. In such a fluoroolefin-vinyl ether polymer the fluoroolefin component is 40 to 60 mole percent, preferably about 50 mole percent, of the total copolymer, while the vinyl ether component is 60 to 40 mole percent and preferably about 50 mole percent of the total copolymer. Exemplary of a silyl-fluoroolefin component which is a mixture is one which is about 80 mole percent tetrafluoroethylene/4-hydroxybutyl vinyl ether copolymer and about 20 mole percent tetrafluoroethylene/2(methyldiethoxysilyl) ethyl vinyl ether copolymer. The polysilicic acid/silyl-fluoroolefin coating composition as used hereinafter is meant to include the above described mixtures as well as the single polymers.

Other additives can be added to the polysilicic acid/silyl-fluoroolefin coating composition to promote leveling, etc. Examples of such a leveling agent are block copolymers of lower alkylene oxide and a lower dialkyl siloxane (U.S. Pat. No. 3,172,899), whose use is described in U.S. Pat. No. 3,476,827. These block copolymers are usually present in the polysilicic acid/silyl-fluoroolefin coating composition at from 0.05 to 5 percent by weight of the total weight of the $SiO_2$, silyl-fluoroolefin coating composition and block copolymer. One such block copolymer is sold by Union Carbide Corporation as Silicone L-520, and is a polymer of dimethyl siloxane grafted with polyethylene oxide and polypropylene oxide. Other examples of useful (alkali resistant) additives are potassium or sodium thiocyanates or sodium or potassium salts of aromatic or aliphatic carboxylic acids, which have no more than 2 carboxylic acid groups and up to 16 carbon atoms. Such additives are usually used in concentrations of 0.02 to 2 percent by weight of the total weight of the $SiO_2$ and silyl-fluoroolefin coating composition. Cyclic polyethers, e.g., 2,5,8,15,18,21-hexaoxatricyclo[20.4.0.0$^{9,14}$]hexacosane, the use of which is described in Vest, U.S. patent application Ser. No. 614,915, filed Feb. 9, 1967, are useful as aqueous resistant additives. Such polyethers are normally used in concentrations of from 0.01 to 5 percent by weight of the total weight of the $SiO_2$ and silyl-fluoroolefin coating composition. Other additives such as pigments, catalysts such as alpha,alpha'azo-bis-isobutyronitrile may also be added to the polysilicic acid/silyl-fluoroolefin coating composition.

The polysilicic acid/silyl-fluoroolefin coating composition with or without the additives depicted above is used as a coating composition. However, to render it conducive to coating, it is normally dissolved in a compatible solvent. The resulting mixture is usually up to 40 percent by weight of the total mixture of the polysilicic acid (measured as $SiO_2$)/silyl-fluoroolefin coating composition. The relative amounts of solvent and polysilicic acid/silyl-fluoroolefin coating composition in the solution depends on, among other things, how thick the final coating is to be. The solvent or solvent system used depends on the polymer employed, substrate onto which the coating is to be put, and other factors such as evaporation rate required, etc. The solvent should boil below 160°C. and preferably, below 125°C. and have appreciable vapor pressure at below 100°C. The solvents are polar in nature and should be compatible with the other ingredients of the solutions in a wide range of proportions. Preferred solvent systems have at least 50 percent by weight of one to six carbon alkanols, e.g., methanol, ethanol, propanol, butanol, etc., up to 15 percent by weight water, and up to about 40 percent by weight of 1 to three carbon alkanoic acids, e.g., formic, acetic, or propionic. Minor amounts of halogenated (chlorine-and/or fluorine-containing) solvents such as trichloroethylene may be present. For coating poly(methyl methacrylate at least 10 percent by weight alkanoic acid should be present. Other usable solvents include the low molecular weight ketones with up through 7 carbon atoms; for example, methyl ethyl ketone, acetone, and methyl isobutyl ketone; ethers such as tetrahydrofuran, 1,4-dioxane, diethylene glycol dimethyl ether, and ethylene glycol dimethyl ether; and chloroacetic acid.

The polysilicic acid/silyl-fluoroolefin coating composition in the solvent is useful in coating substrates. By choice of solvent and component polymers, application conditions and pre-treatments (including pre-coating) of the substrates, the polysilicic acid/silyl-fluoroolefin coating composition can be caused to adhere to substantially all solid surfaces, i.e., solid substrates. The polysilicic acid/silyl-fluoroolefin coating composition of this invention is therefore useful for coating on wood, metals, glass, and relatively dimensionably stable synthetic organic polymeric materials in sheet or film form (some of which are transparent) such as acrylic polymer for example, poly(methyl methacrylate); polyesters (including objects having fiber fillers) for example, poly(ethylene terephthalate) and polycarbonate, in particular, poly(diphenylol propane) carbonate and poly(diethylene glycol bis allyl) carbonate; polyamides; polyimides; cellulosic thermoplastics; butyrates; polyvinyl fluoride; acrylonitrile/butadiene/styrene terpolymer; polyvinyl chloride; polystyrene; polyoxymethylene; etc. Polymeric materials coated with the polysilicic acid/silyl-fluoroolefin coating compositions are useful in the fabrication of flat or curved plastic enclosures, such as windows, skylights, windshields, lenses, etc., particularly for transportation equipment. The coated polymeric materials are particularly useful as ophthalmic lenses, i.e., a transparent organic polymeric material in the form of an ophthalmic lens has its usefulness significantly increased by coating with the polysilicic acid/silyl-fluoroolefin coating composition.

A process for treating such substrates comprises contacting the solid substrate with the polysilicic acid/silyl-fluoroolefin coating composition in compatible solvent. This can be done by dipping, spraying, flow coating or doctoring. The volatile materials are then removed from the coating by air drying. Air drying is normally carried out in an atmosphere which is less than about 50 percent relative humidity (20 to 40 percent preferred) at about 80°F. for up to a out 16 hours. The coated substrate is then cured by heating the coated substrate at from 75° to 200°C. for up to about 24 hours, with the usual time being 30 to 60 minutes at the high temperatures. The temperature of curing is preferred at about 170°C., although temperatures above the 200°C. limit can be used, depending on the substrate. Curing times and temperatures depend on the substrate as well as the coating composition.

Articles resulting from the above process, i.e., substrates that are coated with the polysilicic acid/silyl-fluoroolefin coating composition usually have a coating which is 0.5 to 20 microns thick, preferably 3 to 8 microns.

The silyl polymer can be prepared, i.e., the polymerization is accomplished, by reacting the monomers depicted above for the silyl polymer at a temperature of from about −20°C. to about 100°C. in the presence of a perfluoroalkylstibine catalyst which has the formula

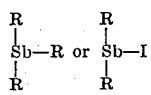

in which R is perfluoroalkyl of from one to eight carbon atoms. Normally, the resulting polymer has an inherent viscosity of 0.5 to 2.5 with the preferred being 1.1 to 2.0.

All inherent viscosities presented in this specification and claims are derived from the expression:

$$\eta\text{inh} = (\ln t/t_o)/C$$

with measurements being made on an Ostwald-Cannon-Fenske viscometer. In the above expression:
$t_o$ = efflux time of the solvent alone
$t$ = efflux time of the polymer solution
$C$ = solution concentration = 0.500 gm/100 ml. unless otherwise specified In the measurements, the following solvents and temperatures are used with the various polymers:

| | |
|---|---|
| silyl-fluoroolefin elastomeric composition 30/3.5 tetrahydrofuran/ dimethyl formamide solution | 30°C. |
| silyl polymer hexafluoroisopropanol | 35°C. |

The silyl-fluoroolefin elastomeric composition is useful as a caulk, sealant, or high performance or oil-resistant elastomer for uses in hose, gaskets, fuel tanks, etc.

The silyl polymer is useful as a coating for glass roving in that it renders the roving more conducive to high speed chopping yet does not degrade polyoxymethylene when the coated chopped roving is incorporated in it.

In the following examples which illustrate, but do not limit the invention, all parts and percentages are by weight unless otherwise specified. Throughout the examples steel wool scratch resistance measurements are determined from a log scale from a standard wiping test in which 1 is excellent (no abrasion by No. 0000 steel wool at 25 psi.) and 20 is equivalent to uncoated poly(methyl methacrylate); Δ haze is the haze development on wiping under standard conditions with a 1:1 slurry of water and air cleaner test dust; the Scotch Brand tape grid test is accomplished by the following procedure: cutting the finished surface through with a sharp edge in a series of parallel lines 1/16 inch apart and then with a cutting of a similar series 1/16 inch apart at right angles to the first series such that a cross-hatched area results, firmly pressing a piece of No. 600 Scotch cellophane tape into contact with the coated area so as to cover the cross-hatched area, and pulling the tape off as rapidly as possible at a 90° angle to the coated surface; modulus strength at 100 percent elongation, permanent set, tensile strength and ultimate elongation in Examples XI to XIII are determined by ASTM D 412; compression set is determined by ASTM D-395; carbon and hydrogen analysis is by combustion analysis; fluorine analysis is by Wickbold analysis, silicon analysis is by Neutron Activation Analysis; notched Izod by ASTM D-256; and tensile strength and tensile elongation in Example XXII are determined by ASTM D-638.

EXAMPLE I

To a solution of 470 g. (7.6 moles) of divinyl ether and 90 g. (0.67 mole) of methyldiethoxy silane was added 0.5 g., 5 percent platinum on carbon. The solution was stirred 6 days at 25°C., filtered and the filtrate distilled to give 378 g. (88 percent recovery) of unreacted, divinyl ether, boiling point 29°–32°C.

Distillation of the residue through an 18-inch spinning band column resulted in 93 g. (68 percent) of 2(methyldiethoxysilyl) ethyl vinyl ether, boiling point 45°–46° C. at 1.5 mm Hg. and 7.5 g. of the diadduct of the silane to the divinyl ether, boiling point 100°–104° C. at 1 mm Hg. The structures were verified by elemental analysis, gas chromatography and infrared and Nuclear Magnetic Resonance spectroscopy.

EXAMPLE II

To a tube was added 1 Kg. methyldiethoxy silane, 5.05 Kg. divinyl ether, and 2.5 g., 5 percent platinum on carbon. The tube was sealed and heated at 100°C. for 4 hours in an autoclave. The result was 1.1 Kg. of 2(methyldiethoxy-silyl) ethyl vinyl ether with a boiling point of 44°–46°C. at 1.2 mm Hg.

EXAMPLE III

To a solution of 710 g. (5.0 moles) of butane diol divinyl ether and 67 g. (0.50 mole) of methyldiethoxysilane was added 0.5 g. of 5 percent platinum on carbon. The reaction mixture was heated at 100°C. for 4 hours, cooled and filtered to remove the catalyst. On distillation 575 g. (90 percent) of the unreacted divinyl ether was recovered, boiling point 47°–52°C. at 5 mm Hg. and 117 g. (85 percent) of methyldiethoxysilylethoxybutyl vinyl ether, boiling point 92° to 92°C. at 0.6 mm Hg. The material was shown to be a single compound by gas chromatography and the structure indicated by elemental analysis and Nuclear Magnetic Resonance spectroscopy.

EXAMPLE IV

To a solution of 790 g. (5.0 moles) of divinyl diethylene glycol and 67 g. (0.5 mole) methyl diethoxysilane was added 0.5 g., 5 percent platinum catalyst on carbon. The reaction mixture was heated at 100°C. for 4 hours. Filtration followed by distillation resulted in 620 g. recovered divinyl diethylene glycol, boiling point 47° to 52°C. at 1 mm. Hg. and 109 g. of methyldiethoxy-silylethoxyethoxyethyl vinyl ether, boiling point 100° to 104°C. at 0.5 mm Hg. Structural identification was determined by gas chromatography, Nuclear Magnetic Resonance spectroscopy and elemental analysis.

EXAMPLE V

A solution of 20.4 g. (0.10 mole) of 2(methyldiethoxysilyl) ethyl vinyl ether (prepared by the procedure described in Example I) in 250 ml. (200 g.) of tert-butanol was catalyzed with 0.05 g. alpha,alpha′azo-bis-isobutyronitrile. The catalyzed solution was placed in a 350 ml. stainless steel pressure tube to which 20 g. of tetrafluoroethylene was then added. After heating at 70°C. for 5 hours, 215 g. of viscous, colorless solution was obtained containing 12.4 percent by weight tetrafluoroethylene/2(methyldiethoxysilyl) ethyl vinyl ether copolymer which was essentially 50 mole percent of each. Iodometric titration showed that 3.2 percent of the 2(methyldiethoxysilyl) ethyl vinyl ether remained unreacted.

EXAMPLE VI

A solution of 14.5 g. (0.125 mole) of 4-hydroxybutyl vinyl ether, 5.0 g. (0.025 mole) of 2(methyldiethoxysilyl) ethyl vinyl ether, 0.05 g. alpha,alpha′azo-bis-isobutyronitrile and 250 ml. (200 g.) of tert-butanol was sealed in a 350 ml. pressure tube. Thirty grams of tetrafluoroethylene was pressurized into the tube and the tube was sealed. The tube was heated at 70°C. for 5 hours. The resulting viscous solution contained 15.5 percent by weight tetrafluoroethylene/4-hydroxybutyl vinyl ether/2(methyldiethoxysilyl)ethyl vinyl ether terpolymer and showed no residual vinyl ether. The polymer was 50 mole percent tetrafluoroethylene and the other 50 mole percent was the two vinyl ethers. The solution was diluted to 11 percent solids with n-butanol.

EXAMPLE VII

A solution of 10.2 g. 2(methyldiethoxysilyl)ethyl vinyl ether, 10.2 g. methoxyethyl vinyl ether and 0.05 g. alpha,alpha′azo-bis-isobutyronitrile in 250 ml. of t-butanol in a 400 ml. stainless steel tube was pressurized to 200 psi. with tetrafluoroethylene and heated 5 hours at 65°C. The resulting solution (190 g.) contained 14.9 percent tetrafluoro-ethylene/methoxyethylvinyl ether/2(methyldiethoxysilyl)ethyl vinyl ether terpolymer with the tetrafluoroethylene being 50 mole percent of the terpolymer. The solution was diluted with 62 g. of methyl ethyl ketone.

EXAMPLE VIII

In this and the following examples the polysilicic acid was prepared by adding 45 g. of 0.1N HCl to a solution of 100 g. ethyl ortho silicate and 47 g. ethanol. The solution which contains 15 percent silica as $SiO_2$ was aged 16–64 hours at 25°C. before use.

A coating solution was prepared by mixing together at room conditions the following ingredients in their respective amounts:

| | |
|---|---|
| polysilicic acid (amount measured as $SiO_2$ although in the 15 percent solution as described above) | 25 g. |
| tetrafluoroethylene/2 (methyldiethoxy- silyl) ethyl vinyl ether copolymer (in 12.4 percent solution as described in Example V) | 100 g. |
| acetic acid | 40 g. |
| n-butanol | 25 g. |
| potassium thiocyanate (20 percent solution in methanol) | 0.25 cc. |
| Silicone L-520 (3 drops) | 0.07 g. |

Four inch × four inch × one-quarter inch Plexiglas G. cast acrylic panels (manufactured by Rohm & Haas Corp.) were cleaned in isopropyl alcohol, immersed in the coating solution above, soaked in the solution for 2 minutes and withdrawn at a rate to give a 2.4 micron thick coating. The coated panels were air dried at 18 percent relative humidity at 80°F. for 30 minutes and then cured in a circulating air oven for 1 hour at 170°C. The resulting coatings were hard and adherent. The following table gives the results of exposure of the coatings to 100 percent relative humidity at 25°C. for various time periods.

Steel Wool

| Time (days) | Δ Haze | Scratch Resistance |
|---|---|---|
| 0 | 0.3 | 1 |
| 21 | 0.3 | 1 |
| 60 | 0.9 | 5 |

The coatings were exposed to a carbon arc Weather-O-Meter (ASTM-E42-57) and failed in 2,000 hours.

EXAMPLE IX

A coating solution was prepared by mixing at room conditions the ingredients below in their respective amounts:

| | |
|---|---|
| polysilicic acid (amount measured as $SiO_2$ although in the 15 percent solution as described in Example VIII) | 25.5 g. |
| tetrafluoroethylene/2 (methyldiethoxysilyl) ethyl vinyl ether/4-hydroxybutyl vinyl ether terpolymer (in 11 percent solution as described in Example VI) | 94.0 g. |
| acetic acid | 30.0 g. |
| potassium thiocyanate (20 percent solution in methanol) | 0.23 ml. |
| 2,5,8,15,18,21-hexaoxatricyclo-[20.4.0.0$^{9,14}$] hexacosane | 0.18 g. |
| Silicone L-520 (4 drops) | 0.09 g. |

Using the procedure of Example VIII acrylic panels were coated with coatings 3.7 microns thick. These were air-dried at 100 percent relative humidity at 82°F. for 30 minutes and cured for 1 hour at 170°C. The coatings had good initial hardness, hot water resistance and base resistance. The following table shows the Δ Haze and steel wool scratch resistance test results for these coatings at 100 percent relative humidity and 25°C. for various time periods.

| Time (days) | Δ Haze | Steel Wool Scratch Resistance |
|---|---|---|
| 0 | 0.1 | 1 |
| 7 | 0.6 | 1 |
| 14 | 1.2 | 1 |
| 21 | 2.3 | 4 |
| 60 | 4.7 | 14–20 |

The coatings did not fail in 2,500 hours of Weather-O-Meter (ASTM-E-42-57) exposure.

EXAMPLE X

A coating was prepared by mixing at room temperature the ingredients below in their respective amounts:

| | |
|---|---|
| polysilicic acid (measured as $SiO_2$ although in a 15 percent solution as described in Example VIII) | 27 g. |
| tetrafluoroethylene/methoxyethyl vinyl ether/2(methyldiethoxysilyl) ethyl vinyl ether terpolymer (in 11 percent solution as described in Example VII) | 94 g. |
| acetic acid | 30 g. |
| potassium thiocyanate (20 percent in methanol) | 0.27 cc. |
| Silicone L-520 | 0.089 g. |

Acrylic panels were coated as in Example VIII with the coating solution. The coatings were dried at 18 percent relative humidity at 80°F. for 30 minutes and cured for 60 minutes at 170°C. Exposure to air at 100 percent relative humidity at 25°C. yielded the following test results:

| Time (days) | Δ Haze | Steel Wool Scratch Resistance |
|---|---|---|
| 0 | 1.5 | 5 |
| 14 | 2.0 | 8 |

EXAMPLE XI

A 400 ml. stainless steel bomb was loaded with 0.2 g. alpha,alpha'-azobisisobutyronitrile, 6 g. 4(2-ethoxydimethylsilylethoxy)butyl vinyl ether, 120 g. neopentane, 22 g. methyl vinyl ether and 40 g. tetrafluoroethylene, and heated at 70°C. for 12 hours. After cooling, and drying of the resulting product in a vacuum oven at 60°C., 48 g. of a rubbery polymer were obtained.

Anal. Found: C, 39.3%; H, 5.1%; F, 46.6%; and Si 1.27%

A mixture of 22.3 g. of the above polymer and 4.5 g. of Easy Process Channel carbon black (containing about 15 wt. percent adsorbed water) was milled and the resulting material was placed in molds in a press and heated 1 hour at 80°C. and then 2 hours at 150°C. The material was cured and had the following physical properties:

| | |
|---|---|
| tensile strength | 420 psi. |
| ultimate elongation | 65% |
| permanent set | 1% |
| compression set, 121°C./70 hr. | 37% |

EXAMPLE XII

Into a 400 ml. stainless steel bomb was loaded 0.2 g. alpha,alpha'-azobisisobutyronitrile, 0.7 g. 2(methyldiethoxy-silyl) ethyl vinyl ether, 120 g. neopentane, 23 g. methyl vinyl ether and 40 g. tetrafluoroethylene, and then the bomb was heated to 70°C. for 12 hours. The resulting polymer was dried under vacuum at 50°C. The inherent viscosity of the 52 g. of polymer obtained was 0.77 (solution concentration = 0.1 percent by weight).

A mixture of 27 g. of the above polymer and 5.4 g. of Easy Process Channel carbon black (containing about 15 wt. percent adsorbed water) was milled and then cured in a press for 1 hour at 80°C. and then 2 hours at 150°C. The resulting vulcanizate was insoluble in tetrahydrofuran and had the following physical properties:

| | |
|---|---|
| modulus at 100% elongation | 220 psi. |
| tensile strength | 730 psi. |
| ultimate elongation | 710% |
| permanent set | 114% |

EXAMPLE XIII

When a polymerization was run under the same conditions as Example XII except 1.3 g. of the silyl monomer was used, and the curing was carried out in the same manner, a vulcanizate with the following properties was obtained:

| | |
|---|---|
| modulus at 100% elongation | 390 psi. |
| ultimate elongation | 220 % |
| tensile strength | 1340 psi. |
| permanent set | 10% |

EXAMPLE XIV

Into a 400 ml. stainless steel bomb was charged with 200 ml. 1,1,2-trichlorotrifluoroethane, 0.2 g. alpha,alpha'-azobis(alpha,alpha-dimethyl-valeronitrile), 7 g. 4(2-diethoxymethylsilylethoxy)butyl vinyl ether, 22 g. methyl vinyl ether and 40 g. tetrafluoroethylene. The bomb was heated at 60°C. for 10 hours, and then the solvent was removed from the resulting solution under vacuum yielding 47 g. of a grease-like polymer

EXAMPLE XV

A 400 ml. stainless steel bomb was loaded with 60 ml. ethyl acetate, 1.6 ml. t-butyl peroxide, 10 g. 4(2-diethoxymethylsilylethoxy)butyl vinyl ether, 45 g. hexafluoropropylene, 61 g. vinylidene fluoride and 18 g. tetrafluoroethylene, and sealed. After being heated at 130° for 8 hours the resulting solution was removed, and the volatiles stripped under vacuum at about 60°C. The yield of polymer was 65.5 g. and it had the following properties:
Anal. Found: C, 35.0%; H, 2.9%; F 61.9% inherent viscosity 0.05 (solution concentration = 0.2 percent by weight)

EXAMPLE XVI

Formaldehyde was generated by pyrolysis of cyclohexyl hemiformal at 145°C. The product vapors were directed through a condenser maintained at 16°C., then through one U-tube approximately 1 inch in diameter by 12 inches in height containing a small amount of mineral oil at 25°C. at the bottom of the tube which acts as a bubble flow indicator. The formaldehyde was then directed into 13 additional U-tubes packed with stainless steel. The first U-tube was at 25°C. and the remaining 12 were at 0°C. The U-tubes removed water, formic acid, and cyclohexanol.

The purified formaldehyde vapor was passed at a rate of about 1.1 parts/min. into a reactor containing 264 parts of benzene, one part of 2(methyldiethoxysilyl) ethyl vinyl ether, and 0.09 part of $(CF_3)_3Sb$. The polymerization proceeded smoothly after a 3-minute induction period. After 8 and 14 minutes additional one part amounts of 2(methyl-diethoxysilyl) ethyl vinyl ether were added to the reaction mixture which was maintained at 40°C. Formaldehyde addition was continued for a total of 19 minutes. The reaction was then stirred under nitrogen for 4 minutes and quenched with four parts of triethylamine in 16 parts of methanol. The crude product was recovered by filtration, washed with three 250-part portions of acetone and dried in a vacuum oven at 25°C. to yield 24.2 parts of product. The product had an inherent viscosity of 1.36.

The crude product was stabilized by solution ester capping. Three parts of crude product was mixed with 54 parts of propionic anhydride and 6 parts of quinoline and stirred under nitrogen for 30 min. The polymer was then taken into solution at 168°C. and cooled. The precipitated polymer was collected by filtration and washed with three portions of 75 percent acetone-25 percent methanol followed by two portions of acetone. The product was quantitatively recovered after vacuum drying overnight. The product had a melting point of 167°C. as determined by differential thermal analysis. It was determined by Nuclear Magnetic Resonance test measurements that the main chains of the copolymer contained 1.0 mole percent of the 2(methylethoxysilyl) ethyl vinyl ether.

EXAMPLE XVII

Formaldehyde was generated as in Example XVI. The purified formaldehyde was passed at a rate of about 1.1 parts/min. into a reactor containing 264 parts of benzene, one part of 2(methyldiethoxysilyl) ethyl vinyl ether, and 0.09 part of $(CF_3)_3Sb$. The polymerization proceeded smoothly after a 6-minute induction period. After 10 minutes an additional one-half part of 2(methyldiethoxysilyl)ethyl vinyl ether was added to the reaction mixture which was maintained at 40°C. Formaldehyde addition was continued for a total of 19 minutes. The reaction mixture was then stirred under nitrogen for three minutes and quenched with four parts of triethylamine in 16 parts of methanol. The crude product was recovered by filtration, washed with three 250-part portions of acetone and dried in a vacuum oven at 25°C. to yield 22.2 parts of product. Its inherent viscosity was 1.63.

The crude product was stabilized by solution ester capping. Three grams of crude product were mixed with 54 parts of propionic anhydride, and 6 parts of quinoline and stirred under nitrogen for 30 minutes. The polymer was then taken into solution at 168°C. and cooled. The precipitated polymer was collected by filtration and washed with three portions of 75 percent acetone-25 percent methanol followed by two portions of acetone. The product was quantitatively recovered after vacuum drying overnight. The product had a melting point of 170°C. as determined by differential thermal analysis. It was determined by Nuclear Magnetic Resonance measurements that the main chains of the copolymer contained 0.5 mole percent of the 2(methyldiethoxysilyl) ethyl vinyl ether.

EXAMPLE XVIII

Formaldehyde was generated by pyrolysis of cyclohexyl hemiformal at 145°C. The product vapors were directed through a condenser maintained at 16°C., then through one U-tube approximately 1 inch in diameter by 12 inches in height containing a small amount of mineral oil at 25°C. at the bottom of the tube which acts as a bubble flow indicator. The formaldehyde was then directed into 13 additional U traps packed with stainless steel. The first U-tube was at 25°C. and the remaining 12 were at 0°C. The U-tubes removed water, formic acid, and cyclohexanol.

The purified formaldehyde vapor was passed at a rate of about 1.1 parts/minute into a reactor containing 264 parts of benzene, two parts of 2(methyldiethoxysilyl) ethyl vinyl ether, and four parts of ethylene oxide. After approximately 2 minutes, 0.1 part of tris(trifluoromethyl)stibine in 8.6 parts of benzene was added to the reaction mixture which was maintained at 40°C. Ethylene oxide was introduced into the formaldehyde entering the reactor at a rate of 0.1 part/min. Additional one-part amounts of 2(methyldiethoxysilyl) ethyl vinyl ether were added at 8 and 14 minutes into the run. Formaldehyde addition was continued for a total of 19 minutes. The reaction was then stirred under nitrogen for four minutes and quenched with four parts of triethylamine in 16 parts of methanol. The crude product was recovered by filtration, washed with three 250-part portions of acetone and dried in a vacuum oven at 25°C. to yield 20 parts of product. The product had an inherent viscosity of 1.4.

The crude product was stabilized by solution ester capping. Three grams of crude product was mixed with 54 parts of propionic anhydride and 6 parts of quinoline and stirred under nitrogen for 30 minutes. The polymer was then taken into solution at 168°C. and cooled. The precipitated polymer was collected by filtration and washed with three portions of 75 percent acetone-25 percent methanol followed by two portions of acetone. The product was quantitatively recovered after vacuum drying for 16 hours at 65°C. The product had a melting point of 162°C. as determined by differential thermal analysis. It was determined by Nuclear Magnetic Resonance and chemical analysis that approximately 1.0 mole percent of the vinyl ether and 0.6 mole percent ethylene oxide had been incorporated into the main chains of the terpolymer.

EXAMPLE XIX

Poly(methyl methacrylate) was injection molded into ophthalmic lenses (55 mm. in diameter × 2 mm. in thickness) which were cleaned with isopropyl alcohol, immersed in the coating solution of Example VIII, soaked for 1 minute and withdrawn at such a rate that a 3.1 micron thick coating resulted. The coated lenses were air dried at 50 percent relative humidity (25°C.) for 16 hours, then cured in a circulating air oven for 24 hours at 85°C. The resulting coatings were hard (steel wool scratch resistance equals 1) and adherent.

EXAMPLE XXI

Cast ophthalmic lenses made of poly(diethyleneglycol bis allyl)carbonate were coated as in Example XIX with coatings 3.4 microns thick. The coated lenses were air dried at 35 percent relative humidity (25°C.) for 1 hour, then cured at 140°C. for 1 hour. The resulting coatings were hard (steel wool scratch resistance equal to 1) and adherent.

EXAMPLE XXII

Polymer was prepared according to the following technique. Formaldehyde gas was generated by continuously pyrolyzing cyclohexyl hemiformal at approximately 145°C. and directing the pyrolysis vapors to a condenser, the temperature of which was regulated to condense cyclohexanol and water and to permit formaldehyde gas to pass through. The vapors then passed through a series of U-tubes approximately one inch in diameter by twelve inches which were filled with stainless steel packing to remove final traces of impurities. The vapors were directed into a 500 ml. glass flask equipped with a stirrer, thermocouple, and containing 260 parts of benzene, 0.5 part of 2(methyldiethoxysilyl)ethyl vinyl ether, and 0.01 part of triphenylmethyl hexafluoroantimonate. The polymerization was continued for 20 minutes during which additional 0.01 and 0.006 part of catalyst and three additional 0.5 part amounts of 2(methyldiethoxysilyl) ethyl vinyl ether were added. The slurry was stirred with 20 ml. of methanol and 5 ml. of triethylamine, filtered and washed with three 300-part amounts of methanol and three 300-part amounts of acetone. The washed polymer was dried in a vacuum oven at 25°C. overnight to yield 17 parts of dry polymer. Incorporation of the silyl vinyl ether into the formaldehyde chains was evident from the fact that the sample was 38 percent stable to potassium hydroxide in benzyl alcohol at 165°C. (40 minutes) and had a melting point 4°C. lower than homopolymer.

1.32 parts of this polymer were dissolved in 480 parts of hexafluoroisopropyl alcohol and this solution evaporated onto 88 parts of hand-chopped roving. The fibers were then dried overnight at 55°C. under vacuum followed by 1 hour at 110°C.

Eighty-five parts of these coated fibers were milled at 190°C. for 10 minutes with 340 parts of capped polyformaldehyde. The resulting material was chopped and injection molded into test specimens for evaluation.

| | |
|---|---|
| notched Izod (average of 8) | .79 |
| range | .75 to .85 |
| Tensile strength (average of 6) | 9500 psi. |
| range | 9300 to 9700 psi. |
| Tensile elongation (average of 6) | 5.3% |
| range | 3.4 to 7.0% |

I claim:
1. A silyl vinyl ether having the formula

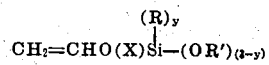

wherein X is selected from the group consisting of an alkylene group containing two to 10 carbon atoms, and an alkyleneoxyalkylene group containing four to 16 carbon atoms; R is an alkyl group containing one to six carbon atoms; y is 0, 1, or 2; and R' is an alkyl group containing one to six carbon atoms.

2. The silyl vinyl ether of claim 1 wherein: X is selected from the class consisting of —CH$_2$CH$_2$—, —(CH$_2$)$_4$OCH$_2$CH$_2$—, —(CH$_2$CH$_2$O)$_2$CH$_2$CH$_2$—, and —CH$_2$CH$_2$OCH$_2$CH$_2$—; R is —CH$_3$; y is 1; and R' is —C$_2$H$_5$.

* * * * *